(12) United States Patent
Parks et al.

(10) Patent No.: US 6,898,733 B2
(45) Date of Patent: May 24, 2005

(54) PROCESS ACTIVITY AND ERROR MONITORING SYSTEM AND METHOD

(75) Inventors: Jeff A. Parks, Santa Clara, CA (US); Sankar-Ram Sundaresan, San Jose, CA (US); Christopher W. Bollerud, Cupertino, CA (US); Thorsten Siegmund, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 622 days.

(21) Appl. No.: 09/999,794

(22) Filed: Oct. 31, 2001

(65) Prior Publication Data

US 2003/0084377 A1 May 1, 2003

(51) Int. Cl.[7] .................................................. G06F 11/00
(52) U.S. Cl. .......................................... 714/15; 714/20
(58) Field of Search ............................. 714/15, 20, 37, 714/39, 49, 50

(56) References Cited

U.S. PATENT DOCUMENTS 5,850,388 A * 12/1998 Anderson et al. ........... 370/252
6,718,489 B1 * 4/2004 Lee et al. ..................... 714/43

* cited by examiner

Primary Examiner—Nadeem Iqbal
Assistant Examiner—Timothy M. Bonura

(57) ABSTRACT

A system and method that uses a process management console to maintain multiple processes that perform software services from within a presentation layer and a database layer. The method includes defining an active process list for a plurality of processes that provide services in the presentation and database layers. Another step is monitoring the plurality of processes that are active in the presentation and database layers by using a process monitor. The next step is determining when one of the processes has abnormally terminated, using the process monitor to periodically compare the active process list to the list of processes currently executing. When a process fails, the system reactivates the process under the automatic control of the process monitor, and the reactivation is performed automatically. The system can also generate an error message that is logged or sent as an email to support personnel when a process has failed.

32 Claims, 4 Drawing Sheets

PROCESS ACTIVITY AND ERROR MONITORING SYSTEM AND METHOD

FIELD OF THE INVENTION

The present invention relates generally to automated process maintenance. More particularly, the present invention relates to monitoring, recovering and providing error notifications for electronic processes that are running in a software layer.

BACKGROUND

When software developers are creating an application, it is possible to incorporate business rules and logic directly into the software application. The problem with this approach is that when the business rules or layouts for the application change, then the user interface, program displays, and business logic must be changed within the application itself. These modifications of the application can be time-consuming and expensive. In software engineering, it is valuable to be able to separate the business rules and the user interface from the application.

In a configuration where the presentation logic and business rules are separated from the application or client, the business logic and presentation layer can be changed without requiring the application layer to be reprogrammed. For example, in a situation using client/server software, the graphical client often resides on a client computer and can request data from a database located at a separate location on a server. If the business rules are programmed at the server level, as part of the database, or as a middleware layer, then it is much easier to modify the business rules without modifying the application or presentation layer.

Another example of separating the application or presentation layer from the business logic layer is a web site that is database enabled. The presentation and formatting of web pages can be separated from the business logic and database.

Separating the database layer, business rule layer, presentation layer, and program logic provides an increased level of maintainability. Unfortunately, the added layers can also add a certain amount of complexity to the interaction between these layers and the technical support for the layers. A side effect of this complexity is that each layer creates multiple independent processes to perform the services and functions for the respective software layer. Several processes can be used by the presentation layer to create electronic documents or web pages, and by a database to perform database queries and handling. In addition, the business rules layer can perform data processing and data checking using multiple processes. If any one of these processes terminates abnormally or experiences other error conditions, this is likely to halt the function of all or a portion of the entire system.

Support personnel and others who maintain the hardware and software underlying such a system can find it difficult to maintain the multitude of processes that exist in this type of complex system. Often the support personnel are manually notified of a process malfunction or crash when the system does not operate properly and ceases providing services, web pages or other functions to end users. Manual notification often takes place through a telephone call from a user who as noticed system problems. Notification and recovery of a process failure at this point in time can create lost business revenues and other significant business disruption. Support personnel have found it difficult to maintain these processes easily and efficiently because of the number of existing processes and the lack of timely information about those processes.

SUMMARY OF THE INVENTION

The invention provides a method for using a process management console to maintain multiple processes that perform software services from within a presentation layer and a database layer. The method includes the step of defining an active process list for a plurality of processes that provide services in the presentation and database layers. Another step is monitoring the plurality of processes that are active in the presentation and database layers. The monitoring can take place using a process monitor located in the process management console. The next step is determining when at least one process has abnormally terminated. The determining step can be performed using the process monitor to periodically compare the active process list to the list of processes currently executing. Once it has been determined that a process has failed, the system reactivates the process that has abnormally terminated via the process monitor, and the reactivation is performed automatically. The system can also generate an error message that is logged and sent as an email when the process monitor has determined that a process has terminated.

In accordance with another embodiment of the present invention, a method is included for providing a support notification regarding errors in processes that are providing services in relation to an electronic document or web page. The method includes the step of enabling an application developer to create a group of pre-defined errors that can occur in the processes. The next step is logging process operations in an error log file. Another step is scanning the error log file periodically after entries in the error log file have been created. Then the entries in the error log file are analyzed to determine if the error belongs to a group of pre-defined errors that requires support notification. When the error is a pre-defined error that requires support notification, a further step is sending the support notification to support personnel or to the console error logging module.

Another embodiment of the invention is a system for providing a support notification regarding a process status for processes in relation to an electronic document request. The system comprises a core processing unit that executes a plurality of processes to fulfill digital document requests. A logging module is coupled to the core processing unit, and the logging unit stores logging data in an error log file. An error log processing module reads the error log file and identifies errors that meet a pre-set error criteria level. In addition, a notification module provides the support notification when the errors meet the pre-set error criteria levels.

Additional features and advantages of the invention will be apparent from the detailed description which follows, taken in conjunction with the accompanying drawings, which together illustrate, by way of example, features of the invention.

DETAILED DESCRIPTION

Figure 1:
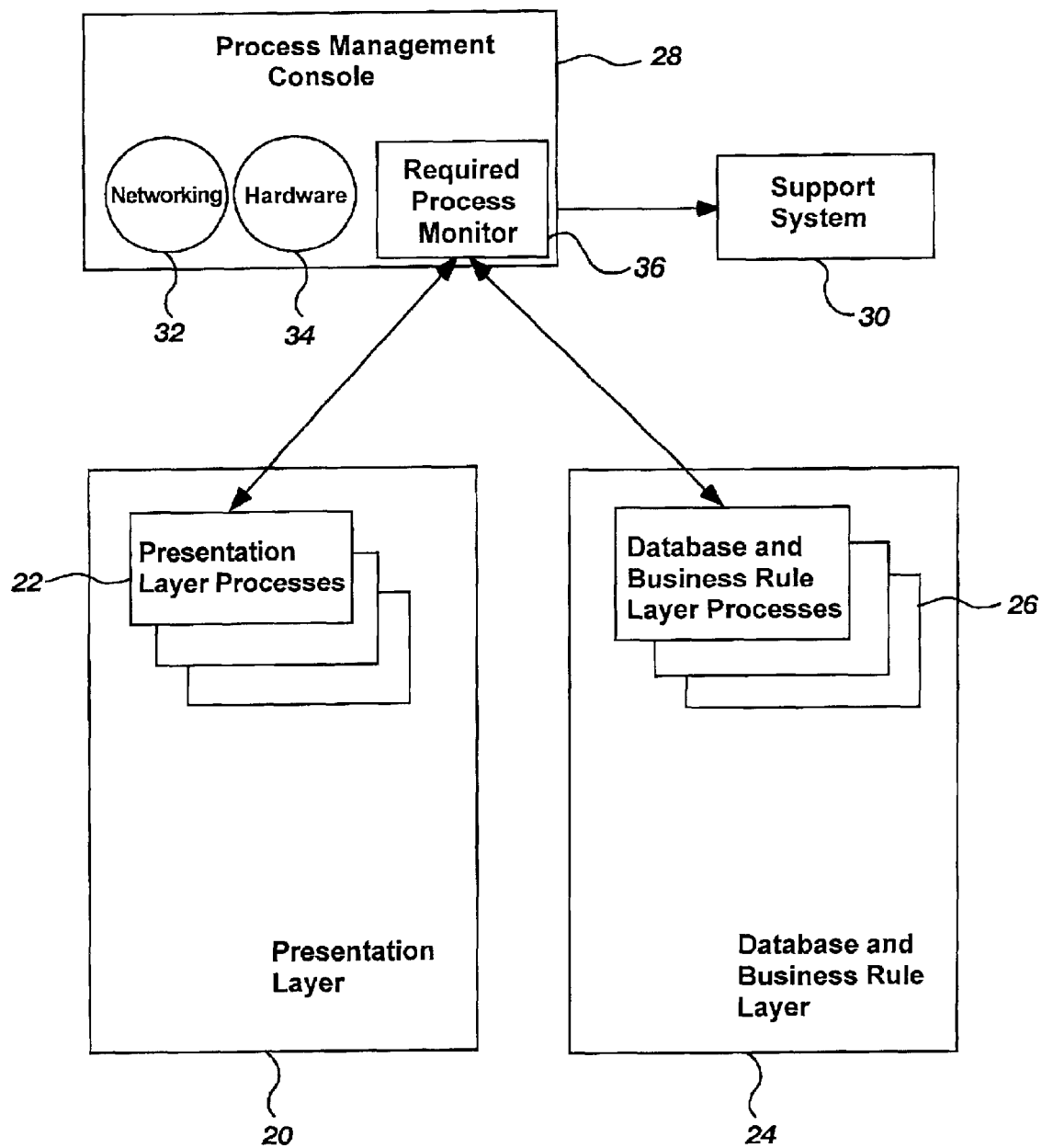
FIG. 1 is a block diagram of a system for monitoring and reactivating processes.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

FIG. 1 is a block diagram that illustrates a system for monitoring multiple processes in a program environment where the tasks are divided between separate processing layers. The presentation layer 20 includes multiple presentation layer processes 22 that need to be monitored and restarted when they fail. The presentation layer will have processes that perform functions which include interpreting presentation and formatting code, communicating with the hardware, processing templates, processing content, generating pages, managing caching, and acting as a web server. A number of database and business rule layer processes 26 will also execute in the database and business rule layer 24. The types of processes that will be running on the database and business rule layer can include such functions as database query processing, business rule processing, web processing, and container processing.

In one embodiment, the processes running on the separate layers are used to assemble and transmit web pages for a web site. For example, the presentation layer can include the formatting and layout needed for the web pages or electronic documents. Page content can also be stored in the presentation layer and this content can be inserted into the page layouts or templates. The database and business rules layer can include database records that are either used in the web pages (e.g., user records) or business rules that affect the database records and control web page accessibility.

Referring further to FIG. 1, the process management console 28 is a software module that is programmed to monitor the multiple processes that are executing on separate layers. In this embodiment, the process management console monitors the processes in the presentation, database and business rule layers. Of course, it can monitor the processes in other layers as needed. The process management console also manages applications, systems, services, the Internet, networks 32, hardware 34, and system storage.

The process management console 28 uses a process monitor 36 that includes an active process list. Processes that should be active in the presentation, database or business rule layers at a given time are listed in the active process list. The process monitor periodically checks to determine whether the list of processes that should be executing on a software layer are executing. These periodic checks may take place in intervals that range from a few milliseconds up to several minutes.

When the process monitor 36 determines that a process has abnormally terminated or failed in some manner, it attempts to automatically restart or reactivate the process without human intervention. The process management console 28 then sends a notification to the support system 30 regarding the status of the process. If the process was successfully reactivated or re-launched, then that information (i.e., the process was restarted) will be sent to the support system or support personnel along with a possible cause of the abnormal termination or process problem. If the process does not successfully restart, then an instant message or email will be sent to human personnel so that the problem with the process can be quickly remedied.

The automatic monitoring and restarting of processes provides the advantage that it increases system availability for end users. Since the present invention automatically reactivates a process that has gone down, the availability of the system is increased dramatically. For example, if a process terminates or fails in a prior art system, then users must notify the support personnel that that system is not working. Alternatively, support personnel may notice that the system is not functioning properly during regular maintenance inspections. This type of notification is slow and can create a significant amount of system downtime and lost transactions.

The presentation layer and database and business rule layer are preferably located on separate servers or processing nodes to distribute the processing load. These layers are also preferably physically separate from the process management console. This separation makes it more difficult to monitor the status of the processes on the separate layers. The present invention helps overcome the problem of monitoring numerous processes on multiple processing units.

This invention also minimizes the time and effort that must be expended by support personnel to monitor and repair the system. Support personnel who use this invention will know that crashed processes will be restarted, if possible, and they will be notified whether or not the process was restarted. Since the support personnel can avoid time consuming human monitoring of the system, they can turn their energy to other types of preventative maintenance and system issues. This in turn reduces the maintenance and support costs for the entity or company who owns the system.

Figure 2:
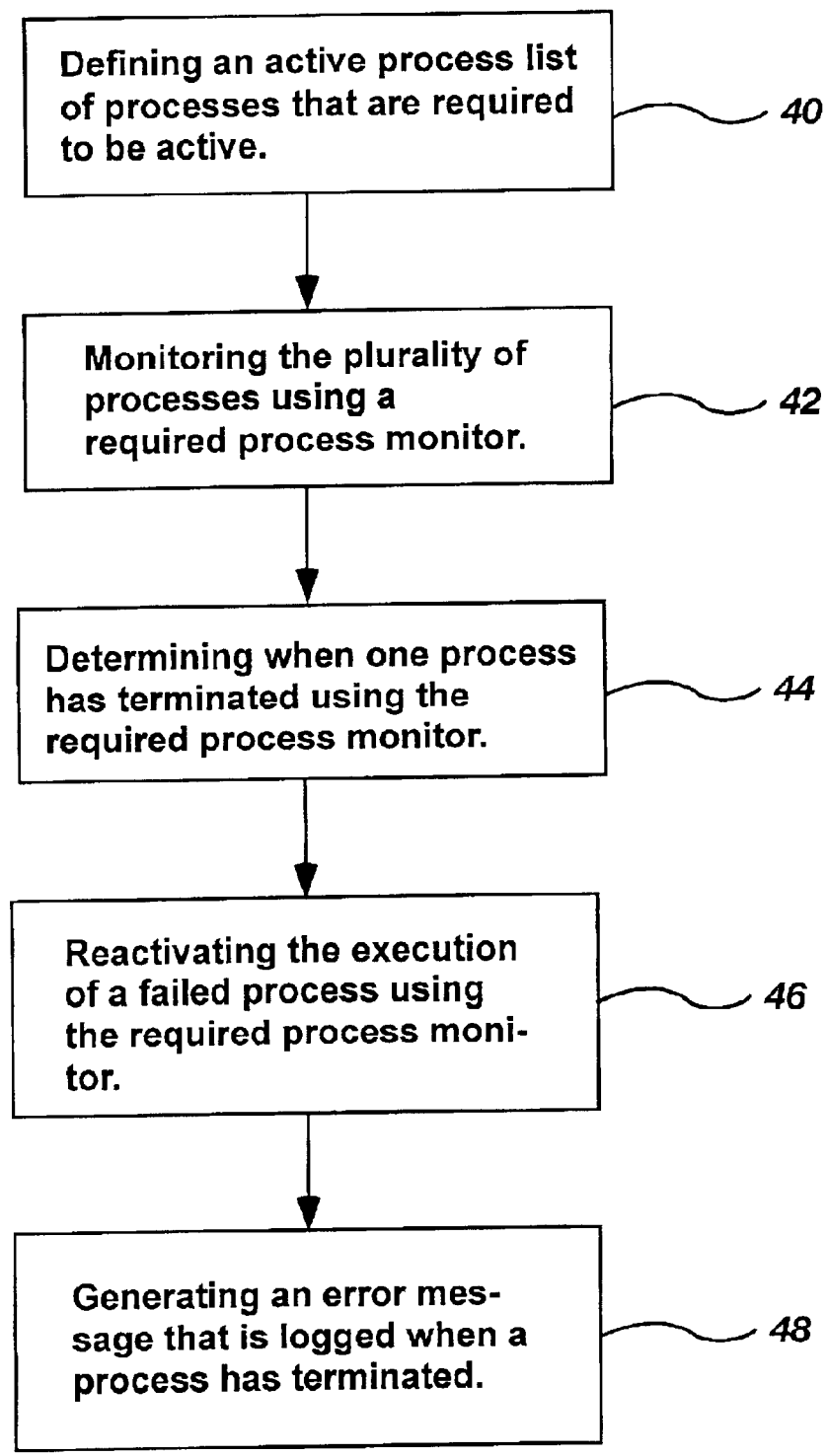
FIG. 2 is flow chart illustrating the steps taken to monitor and restart system processes.

Another embodiment of the invention is a method as illustrated in FIG. 2 for using a process management console to maintain multiple processes that perform software services from within a presentation layer and a database layer. The method includes the step of defining an active process list for a plurality of processes that are used to provide services in the presentation and database layers 40. Another step is monitoring the plurality of processes that are active in the presentation and database layers 42. The monitoring can take place using a process monitor located in the process management console. The next step is determining when a process has abnormally terminated 44. The determining step can be performed using the process monitor to periodically compare the active process list to the list of processes currently executing.

Once it has been determined that a process has failed, the system reactivates the process that has abnormally terminated via the process monitor, and the reactivation is performed automatically 46. It is also important to generate an error message that is logged and then sent to support personnel, when the process monitor has determined that a process has terminated 48. Once an error message has been generated and the system has attempted to re-launch the process, then monitoring of the plurality of processes can be restarted.

Another embodiment of the invention regarding error management will now be discussed. To understand the logging design illustrated in FIG. 3, one must first understand the core architecture design of the layered software system and how the layers work together to make most of the logging transparent to the web application or web pages. The core page processing 102 receives a web page display request 100 from a networked user and includes three sub-systems. The first sub-system is the "Main" library, which is a non-cached presentation template responsible for setting up procedures, variables and any dynamic content that can change from page to page. The next two sub-systems procedures call cached templates of the presentation component architecture. The first procedure sets up a page header (e.g., page top) and a page navigation portion of the web page component; a software developer can then add custom code. The second procedure is called last to complete the entire page and display the bottom portion of the page.

The activity data 106, and performance data 104 are logged automatically whenever the web site application or web pages call the core page processing. No log records are recorded for included presentation components that can operate independently within a page. However, if the core "Main" is used in a web page component, the developer will have access to performance and error logging API's (Application Programming Interfaces).

When web pages are designed, they are programmed to call the error logging APIs. As the API's are called, they setup logging variables with the error logging information that needs to be recorded. When the last procedure is called to complete the page processing, the data is appended to the appropriate log file. This method creates one log entry per page request, although more entries per page may be created if desired. Error logging may record errors immediately as a web page error may prevent the last procedure from ever being called.

Figure 3:
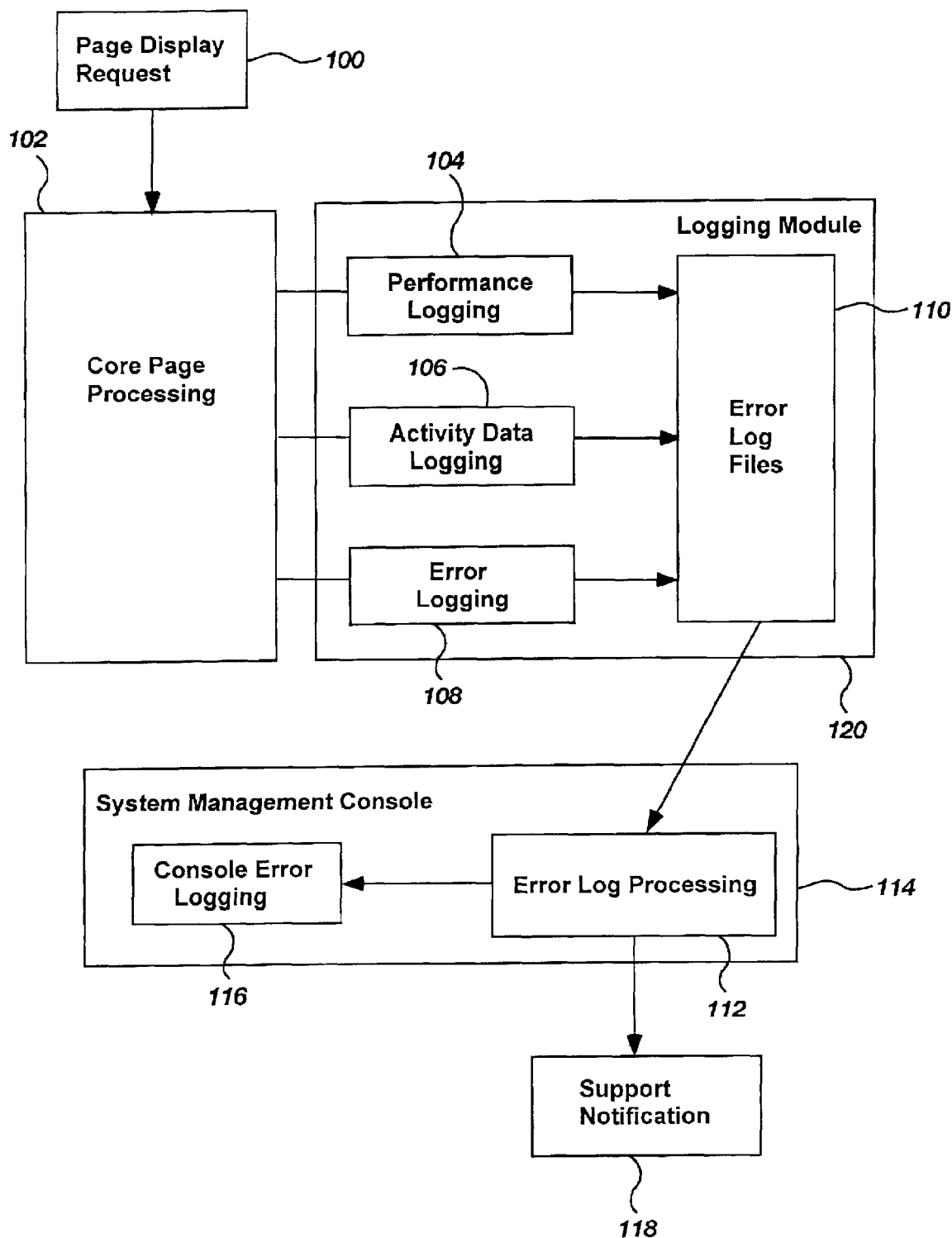
FIG. 3 is a block diagram of an error log processing system.

As illustrated in FIG. 3, the logging activity in the process management system is focused on collecting information about business activities 106, performance 104 and errors 108. At a minimum, there is at least one error log file 110 to aid in tracking this information. To facilitate independent processing of the information collecting, there can be three log files related with the process management system, one for each type of logging.

To aid in the error collection process there is a single, consistent error catalog provided in the logging module 120 that can be both easily updated and referenced. This allows developers to create new error messages as needed and gives support staff the ability to research problems to find solutions. In effect, the error catalog can be a support knowledge base for support personnel to pro-actively solve issues quickly.

In one embodiment of the invention, the presentation layer can be built on Vignette® which is created by the Vignette corporation. The presentation layer will have at least one log file and log file format document. The purpose of system error logging is to provide pro-active notification of system errors to support personnel. This data can be effectively used for troubleshooting.

In another embodiment of the invention, there can be two error log files in the process management system. The first one is the primary error log file, which can be used to log errors in a one-line per log entry format. A flat file system is the preferably used to implement the error log but the error log can be implemented in other formats known to those skilled in the art of computer databases. A flat file implementation is useful because it is easy to read and write to storage, and simple delimiters can be used between fields such as pipes "|" or commas. The error log file preferably has one line per log record.

A second log file is the error trace file, which can be used to log the stack trace associated with the programming language exception that triggered an error (e.g. a Java or C++ exception). This file records any diagnostic information that can help in capturing the context in which the error occurred. These error logs are accessible to the system management console and may be written on an accessible storage system outside of a firewall.

The error logs store a number of fields that are written as a record on each line. Each error entry or record can include the following possible fields, and other fields can be included as needed.

| Field Name | Short Description |
| --- | --- |
| Timestamp | A timestamp when the log event occurred. |
| SessionID | A business session ID. |
| Service Name | Name of the service where the error occurred. |
| Error Code | An error number serves as the key to the error catalog. |
| Error Location | An error location associated with the error code. |
| Error Name | An error name associated with the error code. |
| Error Message | A brief description about the reported error condition. |
| Error Resolution | A very brief description about how to correct or avoid the reported error condition. |
| Stack Trace | A stack trace associated with the exception that originally caused the error condition in the system. |

An example of an error record may look like this:
Client Transaction ID|Error Code|Error Name|Error Location|Error Message|Timestamp|SSA Session ID|Error Resolution Referring again to FIG. 3, the error log processing module 114 periodically monitors the error log file 110, by scanning and breaking apart the error code field. After breaking apart the error code field, the system checks to see if the error code found in the log record can be interpreted as a specific error. Of course, the error log processing module may continuously monitor the error log file if a more real time type of feedback is desired. When an error code falls within a system error range, the error log processing module can then take the log record and perform at least two further steps.

First, the system sends a notification to the console error logging module 116 with error information. Second, the system sends an e-mail notification containing detailed error information that is extracted from the error log. This e-mail notification can be sent out to an e-mail address of one or more of the support personnel once it has been finalized. Furthermore, the field that the error log processing module uses to interpret and make decisions on is the error number field. The other information that is displayed in the email message is generally transferred in a readable format as it was written to the log(s).

For example, an error log record may look like the following:
Vign87473837|CISS-20547|CIDBConnectionPoolError|SSA78|CIDB Connection pool lost all DB connections|10/19/2000, 10:00:11|miniEASL37378465|Please check the Oracle listener
Then the process management console can send an e-mail as follows:
Process Management Console encountered the following error:
Client Transaction ID: Vign87473837
Error Number: CISS-20547
Error Range: Database related errors
Location: SSA78
Error Name: CIDBConnectionPoolError
Error Message: CIDB Connection pool lost all DB connections From a design point of view, the ranges of error numbers denoting specific problems are preferably standardized. This ensures that the similar problems occurring in different processes or software services get reported using error numbers falling in the same general range.

For example, if a database-related problem occurs, all the services use a number in the same range to report this type of error. Thus, the range in which a given error number falls can be used to infer a broad starting point for troubleshooting.

There are two broad categories of errors and they are system errors and business errors. System errors occur because something is wrong with the system and they are usually not caused by bad user input. System errors generally require automated and/or manual intervention to rectify as described previously. Examples of system errors are a database failure, or some part of the system failing to respond to queries from other parts of the system.

Business errors, on the other hand, are usually caused by bad user input (i.e., bad data) or bad user actions (trying to access a feature that the user is not entitled to access). Business errors can generally be corrected by the users and do not require any intervention. The error numbers are broken into distinct ranges for reporting system errors, business errors and general errors. Within each category, the ranges can be further broken down to denote specific conditions and/or geographic locations where the error occurred.

Below is a breakdown of four areas of logging with more details about the specific information that each collects.

Business Activity Logging

The purpose of business activity logging is to record user's activities within the system. This information in turn may be used for business reporting and troubleshooting. All errors will be logged to the error log immediately and the most severe errors can be logged in a business activity log.

The activity logging happens automatically for every page a customer visits. Errors are logged and recorded as they occur. The data that can be collected for activity logging can include: Transaction ID, Session ID, Timestamp, User ID, Page Creation Time, Application Name, Transaction Name, ErrorCode and similar data fields.

Performance Logging

The purpose of performance logging is to provide a history of performance measurements for user activities. This data in turn may be used for performance monitoring, analysis, and troubleshooting. Although the data is similar to information collected in the business logs, there are several reasons to keep the performance logs separately. First, the performance logs need the separate ability to be turned on and off on the fly. Second, the performance logs will read by a third party program that may require special formatting or timing.

Error Logging

The purpose of system error logging or general error logging is to provide pro-active notification of system errors to support personnel. While all errors will be logged to the error log file, the most severe error for a given page will be recorded with the business activity log. When a developer discovers a new error, the developer can create a new entry in the error catalog.

Figure 4:
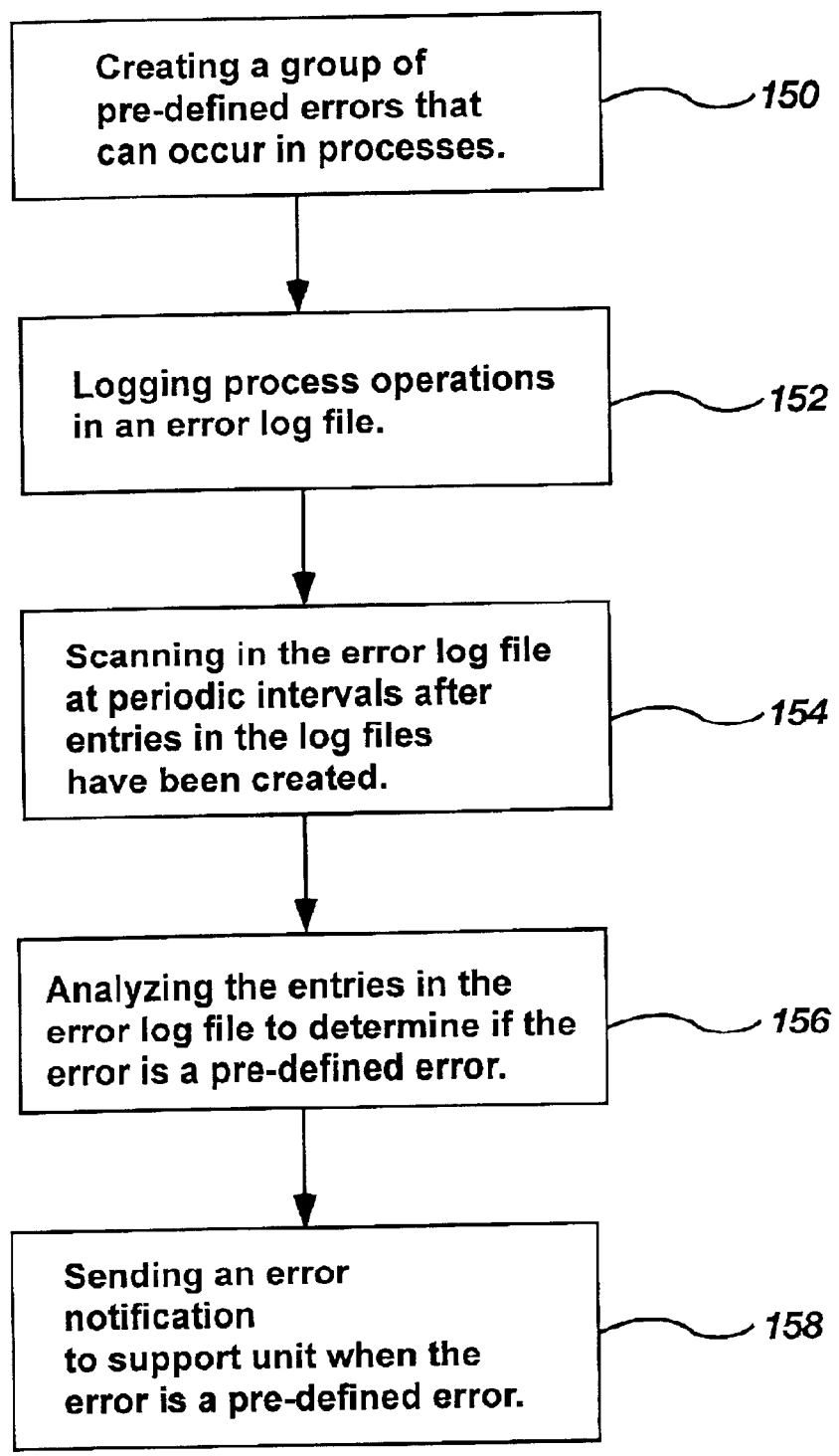
FIG. 4 is flow chart illustrating the steps taken to process the error log and send corresponding error and maintenance notifications.

Another embodiment of the invention is a method for providing a support notification regarding errors in processes that are assembling an electronic document or delivery of a web page. FIG. 4 is a flow chart that illustrates the step of creating a group of pre-defined errors that can occur in processes 150. The group of pre-defined errors can be stored in an error catalog as discussed previously. A further step is logging process operations in an error log file 152. Another step is scanning the error log file periodically after entries in the error log file have been created 154. The scanning of the error log file can take place continuously, every few seconds or every few minutes.

In the next step, the entries in the error log file are analyzed to determine if the error belongs to a group of pre-defined errors that requires support notification 156. In other words, some errors may require that a support notification will be sent and other errors will just be logged without the reporting of a support notification. The errors will be pre-defined as to which errors require a support notification or what critical error levels will trigger a support notification. A further step is sending the support notification when the error is a pre-defined error that requires support notification 158. The support notification can be sent to a system management console, which may allow a support person to view the support notifications in real time. The support notification can also be sent as an email message, or a similar electronic message.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in implementation, form, function and manner of operation, assembly and use may be made, without departing from the principles and concepts of the invention as set forth in the claims.

What is claimed is:

1. A method, comprising:
dividing a software application into multiple processes that perform software services from within a presentation layer and a database layer;
defining an active process list for a plurality of processes that provide services in the presentation and database layers;
monitoring the plurality of processes that are executing in the presentation and database layers, using a process monitor located in a process management console;
determining when one of the processes has abnormally terminated by using the process monitor to periodically compare the active process list to the list of processes currently executing; and
reactivating the terminated process that has abnormally terminated, under the automatic control of the process monitor.

2. A method as in claim 1, further comprising the step of generating an error message that is logged when the process monitor has determined that a process has terminated.

3. A method as in claim 1, further comprising the step of restarting the monitoring of the plurality of processes that are active in the presentation and database layers.

4. A method as in claim 1, further comprising the step of monitoring presentation layer processes to determine an execution state of the presentation processes.

5. A method as in claim 1, further comprising the step of monitoring a database and business rules layer to determine an execution state of the processes for the database and business rules layer.

6. A method as in claim 2, generating an error message that is logged in a database in the process management console.

7. A method as in claim 2, generating an error message that is transmitted to a support system.

8. A method as in claim 2, generating an error message that is transmitted to human support personnel.

9. A method as in claim 1, wherein the active process list includes processes that should be executing in the presentation layer and the database layer.

10. A method as in claim 1, wherein the multiple processes perform software services to assemble and transmit web pages of a web site.

11. A method as in claim 10, further comprising: formatting, with the presentation layer, the web pages.

12. A method as in claim 10, further comprising: storing, in the presentation layer, the web pages.

13. A method as in claim 10, further comprising: storing, in the database layer, database records that are used in the web pages.

14. A method as in claim 10, further comprising: storing, in the database layer, rules that effect control access to the web pages.

15. A method as in claim 1, wherein the presentation layer and the database layer are located on separate processing nodes to distribute processing loads of the software services.

16. A method as in claim 1, wherein the presentation layer and the database layer are located in physically separate nodes from the process management console.

17. A method, comprising:
   providing multiple software layers each having multiple processes that process software services in relation to an electronic document;
   enabling an application developer of the electronic document to create a group of pre-defined errors that can occur in the processes;
   logging process operations in an error log file, as the errors occur in the processes;
   scanning the error log file periodically after entries in the error log file have been created;
   analyzing the entries in the error log file to determine if the error belongs to the group of pre-defined errors that require support notification;
   sending support notification when the error is a pre-defined error that requires support notification.

18. A method as in claim 17, further comprising the step of sending the support notification to a system management console.

19. A method as in claim 18, further comprising the step of allowing a support person to view support notifications on the system management console in real time.

20. A method as in claim 18, further comprising the step of recording the support notification in an error log within the system management console.

21. A method as in claim 18, further comprising the step of sending the support notification to a support person as an email message.

22. A method as in claim 18, further comprising the step of logging errors in the error log file where the errors are selected from the group of errors consisting of performance errors, activity process errors, and general errors.

23. A method as in claim 17, wherein the multiple processes perform software services to assemble web pages.

24. A method as in claim 17, wherein the multiple processes perform software services to transmit web pages.

25. A system, comprising:
   a core processing unit that executes a plurality of processes to fulfill digital document requests, wherein the processes are provided in multiple software layers that process software services in relation to an electronic document;
   a logging module, coupled to the core processing unit, wherein the logging unit stores log data in an error log file;
   an error log processing module to read the error log file and identify errors that meet a pre-set error criteria level; and
   a notification module to provide support notification regarding a process status for the processes that are performing processing in relation to the electronic document, the support notification being provided when the errors meet the pre-set error criteria levels.

26. A system as in claim 25, further comprising a console error logging unit to log errors that meet the pre-set error criteria level.

27. A system as in claim 25, wherein the logging module logs process performance data to determine if processes are performing at pre-determined performance levels.

28. A system as in claim 25, wherein the logging module logs process activity data to determine whether a process has failed.

29. A method, comprising:
   providing multiple software layers each having multiple processes that process software services in relation to an electronic document;
   creating a group of pre-defined errors that can occur in the processes, wherein the pre-defined errors are stored in an error catalog;
   logging process operations in a error log file, as the errors occur in the processes;
   scanning the error log file periodically after entries in the error log file have been created;
   analyzing the entries in the error log file to determine if the error belongs to the group of pre-defined errors that require support notification;
   sending support notification when the error is a pre-defined error that requires support notification.

30. A method as in claim 29, further comprising the step of sending the support notification to support personnel.

31. A method as in claim 29, wherein the multiple processes perform software services to assemble web pages.

32. A method as in claim 29, wherein the multiple processes perform software services to transmit web pages.

* * * * *